United States Patent
Guan et al.

(10) Patent No.: US 10,524,291 B2
(45) Date of Patent: Dec. 31, 2019

(54) USER EQUIPMENT, BASE STATION, DATA CHANNEL SENDING METHOD, AND DATA CHANNEL RECEIVING METHOD

(71) Applicant: Huawei Technologies Co., Ltd., Shenzhen (CN)

(72) Inventors: Lei Guan, Beijing (CN); Qiang Li, Shenzhen (CN); Juan Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/934,461

(22) Filed: Mar. 23, 2018

(65) Prior Publication Data
US 2018/0213569 A1    Jul. 26, 2018

Related U.S. Application Data

(63) Continuation of application No. PCT/CN2015/090790, filed on Sep. 25, 2015.

(51) Int. Cl.
*H04W 74/08* (2009.01)
*H04W 72/04* (2009.01)
(Continued)

(52) U.S. Cl.
CPC ....... *H04W 74/0816* (2013.01); *H04L 5/0007* (2013.01); *H04L 5/0057* (2013.01);
(Continued)

(58) Field of Classification Search
None
See application file for complete search history.

(56) References Cited

U.S. PATENT DOCUMENTS 9,838,102 B2 * 12/2017 Xiao .................... H04W 72/082
2011/0280203 A1 * 11/2011 Han ....................... H04L 1/0031
                                                                370/329
(Continued)

FOREIGN PATENT DOCUMENTS

CN        104540158 A    4/2015
CN        104717687 A    6/2015
(Continued)

OTHER PUBLICATIONS

"Discussion on RRM measurement and DRS design for LAA",3GPP TSG RAN WG1 Meeting #80bis,Belgrade, Serbia, R1-151806, 3rd Generation Partnership Project, Valbonne, France (Apr. 20-24, 2015).

(Continued)

*Primary Examiner* — Kevin D Mew
(74) *Attorney, Agent, or Firm* — Leydig, Voit & Mayer, Ltd.

(57) ABSTRACT

Embodiments of the present disclosure provide a data channel sending method. In the method, a base station starts a clear channel assessment (CCA) on a data channel for a to-be-sent data channel. If the CCA on the data channel succeeds, the base station sends the data channel in a first subframe within a time window, where the data channel performs rate matching based on a reference signal (RS). The RS includes a first RS or a second RS. The first RS occupies continuous OFDM symbols in a subframe, and the second RS occupies discontinuous OFDM symbols in a subframe. The time window is a preset time window used to send the first RS, and the first RS is used by a user equipment (UE) to perform cell identification and/or a radio resource management (RRM) measurement on a cell served by the base station.

10 Claims, 4 Drawing Sheets

(51) Int. Cl.
*H04L 5/00* (2006.01)
*H04L 27/26* (2006.01)
*H04W 16/14* (2009.01)
*H04W 24/10* (2009.01)
*H04W 84/12* (2009.01)
*H04L 1/00* (2006.01)

(52) U.S. Cl.
CPC ......... *H04L 27/2604* (2013.01); *H04W 72/04* (2013.01); *H04W 74/08* (2013.01); *H04L 1/0013* (2013.01); *H04L 5/0048* (2013.01); *H04W 16/14* (2013.01); *H04W 24/10* (2013.01); *H04W 72/0446* (2013.01); *H04W 84/12* (2013.01)

(56) References Cited

U.S. PATENT DOCUMENTS

| | | | | |
|---|---|---|---|---|
| 2013/0195047 | A1* | 8/2013 | Koivisto | H04W 72/0406 370/329 |
| 2014/0126490 | A1* | 5/2014 | Chen | H04L 5/0048 370/329 |
| 2014/0247796 | A1* | 9/2014 | Ouchi | H04L 5/0053 370/329 |
| 2015/0049712 | A1 | 2/2015 | Chen et al. | |
| 2015/0200754 | A1* | 7/2015 | Sayana | H04B 7/024 370/329 |
| 2015/0223245 | A1* | 8/2015 | Cheng | H04W 48/16 370/329 |
| 2015/0249526 | A1* | 9/2015 | Kim | H04L 5/0051 370/329 |
| 2015/0304995 | A1* | 10/2015 | Yi | H04L 5/001 370/329 |
| 2016/0057731 | A1* | 2/2016 | Damnjanovic | H04W 68/005 455/458 |
| 2016/0073366 | A1* | 3/2016 | Ng | H04W 56/001 370/329 |
| 2016/0227548 | A1* | 8/2016 | Nimbalker | H04W 72/042 |
| 2017/0303288 | A1 | 10/2017 | Li et al. | |
| 2018/0048446 | A1* | 2/2018 | Jiang | H04L 5/0051 |
| 2019/0007931 | A1 | 1/2019 | Harada et al. | |

FOREIGN PATENT DOCUMENTS

WO 2015133825 A1 9/2015
WO 2017030053 A1 2/2017

OTHER PUBLICATIONS

"DRS design for LAA",3GPP TSG RAN WG1 #82,Beijing, China,R1-154067, 3rd Generation Partnership Project, Valbonne, France (Aug. 24-28, 2015).

"DRS design in LAA", 3GPP TSG RAN WG1 meeting #82,Beijing, China, R1-154264, 3rd Generation Partnership Project, Valbonne, France (Aug. 24-28, 2015).

"Considerations on Measurements for LAA",3GPP TSG RAN WG1 Ad-hoc Meeting,Paris, France, R1-151022, 3rd Generation Partnership Project, Valbonne, France, (Mar. 24-26, 2015).

"Work Item on Licensed-Assisted Access to Unlicensed Spectrum," 3GPP TSG RAN meeting #69, Phoenix, USA, RP-151390, pp. 1-16, 3rd Generation Partnership Project—Valbonne, France (Sep. 14-16, 2015).

"WF on multiplexing PDSCH and DRS," 3GPP TSG RAN WG1 #82, R1-154867, Beijing, China, pp. 1-2, 3rd Generation Partnership Project—Valbonne, France (Aug. 24-28, 2015).

"DRS design and performance evaluation for LAA," 3GPP TSG RAN WG1 Meeting #82bis, R1-155101, Malmo, Sweden, pp. 1-8, 3rd Generation Partnership Project—Valbonne, France (Oct. 5-9, 2015).

"Details of DRS design for LAA," 3GPP TSG RAN WG1 Meeting #82, Beijing, China, R1-154075, 3rd Generation Partnership Project, Valbonne, France (Aug. 24-28, 2015).

"DCI Transmission for the DL Partial Subframe in LAA," 3GPP TSG RAN WG1 Meeting #81, R1-152994, Fukuoka, Japan, XP050973482, pp. 1-4, 3rd Generation Partnership Project—Valbonne, France (May 25-29, 2015).

"Further discussion on RRM measurement and DRS design for LAA", 3GPP TSG RAN WG1 81 Meeting, R1-152472, Fukuoka, Japan, XP050970909, pp. 1-6, 3rd Generation Partnership Project—Valbonne, France (May 25-29, 2015).

\* cited by examiner

USER EQUIPMENT, BASE STATION, DATA CHANNEL SENDING METHOD, AND DATA CHANNEL RECEIVING METHOD

CROSS-REFERENCE TO RELATED APPLICATIONS

This application is a continuation of International Patent Application No. PCT/CN2015/090790, filed on Sep. 25, 2015, the disclosure of which is hereby incorporated by reference in its entirety.

TECHNICAL FIELD

The present disclosure relates to the communications field, and in particular, to user equipment, a base station, a data channel sending method, and a data channel receiving method in the wireless communications field.

BACKGROUND

A Long Term Evolution (LTE) system is based on an orthogonal frequency division multiple access (OFDMA) technology. A time-frequency resource is divided into OFDM symbols in a time domain dimension and OFDM subcarriers in a frequency domain dimension. A minimum resource granularity is referred to as a resource element (RE), indicating a time-frequency grid formed by one OFDM symbol in the time domain and one OFDM subcarrier in the frequency domain. In the LTE system, a service is transmitted based on scheduling by a base station. A specific scheduling process is as follows: A base station sends a control channel, where the control channel may carry scheduling information of a physical downlink shared channel (PDSCH) or a physical uplink shared channel (PUSCH), and the scheduling information includes control information such as resource allocation information and a modulation and coding scheme; and a UE receives a downlink data channel or sends an uplink data channel according to the scheduling information carried in the control channel. Herein, the PDSCH is equivalent to the downlink data channel, and the PUSCH is equivalent to the uplink data channel. Generally, the base station implements scheduling for the user equipment (UE) on a per resource block pair (RBP) basis. A resource block pair occupies a length of one subframe in the time domain, and occupies a width of 12 OFDM subcarriers in the frequency domain. One subframe generally includes 14 OFDM symbols.

To maintain service transmission or perform cell selection, reselection, or handover, the UE needs to perform synchronization, cell identification, and a radio resource management (RRM) measurement according to a reference signal sent by the base station. The RRM measurement includes a measurement of a reference signal received power (RSRP), reference signal received quality (RSRQ), a received signal strength indicator (RSSI), and the like. A reference signal used to implement the foregoing functions in a current small cell is referred to as a discovery reference signal (DRS), specifically including a primary synchronization signal (PSS), a secondary synchronization signal (SSS), and a cell-specific reference signal (CRS). The PSS and the SSS are mainly used for cell synchronization and cell identification, and the CRS is used for RRM measurement. Certainly, the UE may use the CRS to implement cell identification, or the like. FIG. 1 shows a schematic diagram of resource locations of a DRS in a resource block. In the prior art, a minimum sending period of a DRS is 40 ms.

Specifically, the DRS is sent within a sending time window appearing every 40 ms, and the sending time window is referred to as a DRS measurement timing configuration (DMTC). Duration of the DMTC is generally 6 ms, and a PSS/SSS in the DRS needs to be sent in a subframe 0 and/or a subframe 5 in the DMTC. It can be seen that the DRS occupies discontinuous OFDM symbols in a subframe. In other words, CRSs are sent on symbols 0, 4, 7, and 11, the PSS/SSS is sent on symbols 5 and 6, and other symbols do not carry the DRS currently.

Frequency spectrums deployed in a serving cell of the existing LTE system are all licensed spectrums, that is, a frequency spectrum can be used only by an operator network for which the frequency spectrum has been purchased. An unlicensed spectrum is attracting increasing attention. Because the unlicensed spectrum does not need to be purchased and can be used by any operator and organization, a specific rule needs to be complied with, to resolve a problem of coexistence of different parties using the unlicensed spectrum. The rule may be referred to as a listen before talk (LBT) rule. Specifically, before sending a signal on a channel of a U-LTE serving cell, a base station needs to perform a clear channel assessment (CCA) on the channel of the serving cell. Once a detected receive power exceeds a threshold, the base station cannot send a signal on the channel temporarily. The base station cannot send a signal on the channel until detecting that the channel is idle. Alternatively, in some cases, the base station further needs to back off for a random period of time. The base station can send a signal on the channel only when the channel remains idle within the backoff time.

Considering that the existing DRS occupies discontinuous OFDM symbols in a subframe, it is not suitable to transmit the DRS on an unlicensed spectrum. This is because other stations in another system or in a same system may detect on idle OFDM symbols that the channel is idle, and then send signals. Consequently, a conflict and interference are generated between the signals sent by these stations and the sent DRS, and problems such as RRM measurement inaccuracy are also caused. Therefore, to send a DRS on the unlicensed spectrum, continuous OFDM symbols need to be occupied. As a result, resource locations of the DRS on the unlicensed spectrum are inconsistent with those of the existing DRS. In addition, another factor that needs to be considered is: The current DRS can be sent only in the subframe 0 and the subframe 5 in the DMTC. This limits opportunities to send the DRS in the DMTC on the unlicensed spectrum. For example, the station learns that the channel is idle on a subframe 1, but the DRS cannot be sent at this time. Therefore, it is necessary to allow the DRS to be sent in a subframe in the DMTC different from the subframe 0 and the subframe 5. The change of the resource locations and a sending mechanism of the DRS on the unlicensed spectrum affects, to some extent, resource reuse occurred when the DRS and a normal control channel and data channel are sent together in a subframe.

SUMMARY

Embodiments of the present disclosure provide user equipment, a base station, a data channel sending method, and a data channel receiving method, to resolve a problem in multiplexing a data channel and/or a control channel and a first reference signal in a same subframe.

According to a first aspect, an embodiment of the present disclosure provides a data channel sending method, including:

starting, by a base station, a clear channel assessment (CCA) on a data channel for a to-be-sent data channel; and if the CCA on the data channel succeeds, sending, by the base station, the data channel in a first subframe within a time window, where the data channel performs rate matching based on a reference signal RS, where the RS includes a first RS or a second RS, the first RS occupies continuous OFDM symbols in a subframe, the second RS occupies discontinuous OFDM symbols in a subframe, the time window is a preset time window used to send the first RS, and the first RS is used by a user equipment (UE) to perform cell identification and/or a radio resource management (RRM) measurement on a cell served by the base station.

In a first possible implementation of the first aspect, the base station sends a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

In a second possible implementation of the first aspect, if an index number of the first subframe is 0 and/or 5, the RS is the first RS; or if the index number of the first subframe is not 0 or 5, the RS is the second RS.

In either of the foregoing possible implementations of the first aspect, if the CCA on the data channel fails, but a CCA on the first RS succeeds, the base station sends the first RS in a maximum of one subframe within the time window, but does not send the data channel.

In any one of the foregoing possible implementations of the first aspect, a sending time point, determined according to the successful CCA on the data channel, of the data channel and/or the control channel that schedules the data channel is a first time point; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

According to a second aspect, an embodiment of the present disclosure provides a data channel receiving method, including:

determining, by a user equipment (UE), a time window according to a time window configured by a base station; and receiving, by the UE, a data channel in a first subframe within the time window, where the data channel performs rate matching based on a reference signal RS, where the RS includes a first RS or a second RS, the first RS occupies continuous OFDM symbols in a subframe, the second RS occupies discontinuous OFDM symbols in a subframe, the time window is a preset time window used to send the first RS, and the first RS is used by the UE to perform cell identification and/or a radio resource management (RRM) measurement on a cell served by the base station.

In a first possible implementation of the second aspect, the UE receives a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

In a second possible implementation of the second aspect, if an index number of the first subframe is 0 and/or 5, the RS is the first RS; or if the index number of the first subframe is not 0 or 5, the RS is the second RS.

In either of the foregoing possible implementations of the second aspect, the UE determines a first time point, in the first subframe, of the data channel and/or the control channel that schedules the data channel; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

According to a third aspect, an embodiment of the present disclosure provides a base station, including:

a detection module, configured to start a clear channel assessment (CCA) on a data channel for a to-be-sent data channel; and a sending module, configured to send the data channel in a first subframe within a time window according to a result that is of the successful CCA on the data channel and that is obtained by the detection module, where the data channel performs rate matching based on a reference signal RS, where the RS includes a first RS or a second RS, the first RS occupies continuous OFDM symbols in a subframe, the second RS occupies discontinuous OFDM symbols in a subframe, the time window is a preset time window used to send the first RS, and the first RS is used by a user equipment (UE) to perform cell identification and/or a radio resource management (RRM) measurement on a cell served by the base station.

In a first possible implementation of the third aspect, the sending module of the base station is further configured to send a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

In a second possible implementation of the third aspect, if an index number of the first subframe is 0 and/or 5, the RS is the first RS; or if the index number of the first subframe is not 0 or 5, the RS is the second RS.

In either of the foregoing possible implementations of the third aspect, if the detection module obtains a result that the CCA on the data channel fails but a CCA on the first RS succeeds, the sending module is configured to send the first RS in a maximum of one subframe within the time window, but does not send the data channel.

In any one of the foregoing possible implementations of the third aspect, a sending time point, determined according to the successful CCA that is on the data channel and that is determined by the detection module, of the data channel and/or the control channel that schedules the data channel is a first time point; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

According to a fourth aspect, an embodiment of the present disclosure provides user equipment, including:

a determining module, configured to determine a time window according to a time window configured by a base station; and a receiving module, configured to receive a data channel in a first subframe within the time window determined by the determining module, where the data channel performs rate matching based on a reference signal RS, where the RS includes a first RS or a second RS, the first RS occupies continuous OFDM symbols in a subframe, the second RS occupies discontinuous OFDM symbols in a subframe, the time window is a preset time window used to send the first RS, and the first RS is used by the UE to perform cell identification and/or a radio resource management (RRM) measurement on a cell served by the base station.

In a first possible implementation of the fourth aspect, the UE receives a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

In a second possible implementation of the fourth aspect, if an index number of the first subframe is 0 and/or 5, the RS is the first RS; or if the index number of the first subframe is not 0 or 5, the RS is the second RS.

In either of the foregoing possible implementations of the fourth aspect, the receiving module is further configured to determine a first time point, in the first subframe, of the data channel and/or the control channel that schedules the data channel; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

According to the foregoing methods, user equipment, and base station in the present disclosure, efficient multiplexing of the data channel and/or the control channel and the reference signal in the time window is implemented, that is, the foregoing mechanism for performing rate matching based on the reference signal by the data channel and/or the control channel reduces overheads in a relatively efficient manner and lowers UE detection complexity.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
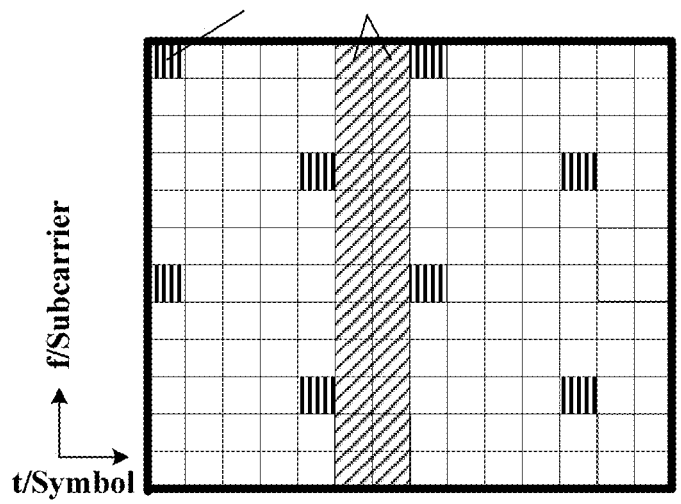
FIG. 1 is a schematic diagram of resource locations of a DRS in an RB in the prior art.
Figure 2:
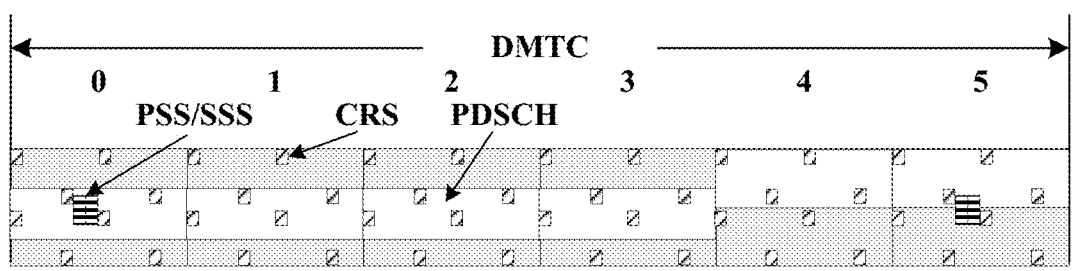
FIG. 2 shows an existing manner of multiplexing a PDSCH and a reference signal in a DMTC.

FIG. 2 shows a manner of multiplexing a control channel and a data channel and a reference signal in a DMTC in a current system. Herein, it is assumed that only a data channel, that is, a PDSCH, and a reference signal in a DMTC are multiplexed. In the prior art, a current DRS that is periodically sent may be set to a maximum length of 5 ms in a DMTC, that is, five subframes, or to a minimum length of one subframe. As shown in FIG. 2, it is assumed that a 5 ms DRS is configured, and the DRS occupies five subframes ranging from a subframe 0 to a subframe 4. It can be seen that a PSS/SSS exists in the subframe 0, and CRSs exist in the subframes 0 to 4. A cell may choose to enable or disable, or activate or deactivate another subframe that is not occupied by the DRS. Once the current cell has no service to serve UE, the current cell may not send any signal in the subframe other than the subframes occupied by the DRS. For example, a subframe 5 in the DMTC is an empty subframe. Alternatively, if the current cell has a service, that is, the current cell is in a normal data communication state, CRSs are sent in each subframe, and PSSs/SSSs need to be sent in subframes 0 and 5. For example, a PSS, an SSS, and CRSs need to be sent in the subframe 5 in the DMTC. In this case, resource locations of the reference signal sent in the subframe 0 are the same as resource locations of a reference signal sent in the subframe 5 in the DMTC, but the subframe 0 is a subframe occupied by the DRS, and is not allowed to be disabled, while the subframe 5 is allowed to be disabled. However, once the subframe 5 is in an enabled state, the resource locations of the reference signal sent in the subframe 5 are the same as those of the DRS in the subframe 0. Therefore, during transmission of a control channel and a data channel, the UE does not need to be additionally informed of resource locations of reference signals in different subframes, because the locations of these reference signals are known in advance. For example, there are CRSs to send in all subframes, and additionally, there are PSSs/SSSs to send in the subframes 0 and 5.

However, for a DRS sent by a cell on an unlicensed spectrum, the DRS cannot occupy discontinuous OFDM symbols when there is no data channel to send. Because once the DRS occupies discontinuous OFDM symbols, for example, current CRSs occupy symbols 0, 4, 7, and 11 (herein, it is assumed that serial numbers of 14 symbols of one subframe are 0 to 13 in sequence according to a time order) in a subframe, an idle period exists between these sending symbols. For example, an idle period of three symbols exists between the symbol 0 and the symbol 4. Generally, duration of one OFDM symbol is about 70 microseconds. Therefore, the idle period lasts for about 210 microseconds. However, a basic CCA detection window required by an LBT rule on the unlicensed spectrum is duration of 10 microseconds. In this case, the idle period may be sufficient to allow neighboring stations to detect that the channel is idle and send signals on the channel. This leads to mutual interference between the neighboring stations and a station sending the DRS, and further causes an interference measurement deviation. Actually, these neighboring stations are not supposed to send signals. Therefore, the interference is overestimated.

Therefore, the DRS sent by the cell on the unlicensed spectrum needs to occupy continuous OFDM symbols even if there is no data channel to send. In one manner, OFDM symbols in the idle period are to be filled with signals, for example, with CRSs. This can further improve RRM measurement performance. In an example, the first 12 OFDM symbols in a subframe 0 or a subframe 5 shown in FIG. 4 constitute anew DRS, and the new DRS is referred to as a DRS on an unlicensed spectrum (U-DRS). That is, the U-DRS occupies symbols 0 to 12 in a subframe, where symbols 1, 2, 3, 8, 9, and 10 are filled with CRSs, and multiple duplicates of an SSS and a PSS on symbols 5 and 6 have been introduced in a frequency domain. Certainly, another U-DRS that occupies continuous OFDM symbols may exist. For example, CRSs are filled on symbols 1, 2, 3, and 8. Considering that symbols 9 and 10 are symbol locations of an existing channel state information-reference signal (CSI-RS), the PSS and/or the SSS may be duplicated in a time domain. For example, the CRSs filled on the symbols are replaced with PSSs and/or SSSs, or the symbols filled with the CRSs are additionally filled with PSSs and/or SSSs.

The LBT rule needs to be complied with when a signal is sent on the unlicensed spectrum. This is different from a case for a licensed spectrum in which a signal can be surely sent at a preset location. In addition, such type of signal as the U-DRS is very important for the system, because the type of signal has functions such as cell synchronization, cell identification, RRM measurement, and even time-frequency tracking and automatic gain control (AGC) adjustment. These functions are bases for performing data communication on the unlicensed spectrum. Therefore, the U-DRS may be sent based on a CCA mechanism different from that for sending a data channel. The CCA mechanism of the U-DRS provides a greater opportunity for successfully sending the U-DRS than that for sending the data channel. Specifically, the CCA mechanism of the data channel has a backoff mechanism, and the backoff mechanism is based on whether a value of a backoff counter is 0. Generally, each time a channel within a CCA time window is found to be idle, the value of the backoff counter may be decreased by 1. The data channel and/or a control channel that schedules the data channel are/is not allowed to be sent until the counter counts down to 0, that is, the data channel and/or the control channel that schedules the data channel are/is not sent immediately when the channel is found to be idle. However, the U-DRS may be sent immediately when the channel is found to be idle. In addition, synchronization signals PSS and SSS in the existing DRS need to be sent in the subframe 0 or the subframe 5, that is, there is only one sending opportunity in the DMTC. However, the U-DRS may be sent in a subframe different from the subframe 0 and the subframe 5 in the DMTC. That is, there are multiple sending opportunities for the U-DRS in the DMTC, and the U-DRS may be sent in whichever subframe on which a CCA succeeds. In other words, a base station may send the U-DRS in one of the multiple subframes, increasing the sending opportunities for the U-DRS.

Based on the foregoing description, it can be learned that RS resource locations of the existing DRS in the DMTC are known in advance by the UE, that is, the PSS and the SSS in the DRS can only be in the subframe 0 and/or the subframe 5, and CRSs in the DRS are existing CRSs occupying discontinuous OFDM symbols in each subframe. Hence, when receiving a data channel and/or a control channel in a subframe in the DMTC, the UE performs rate matching based on the preset RS. The rate matching means that a base station needs to bypass some RS resource locations when performing resource mapping on a data channel, and correspondingly, the UE also needs to perform, when receiving the data channel, demapping on the data channel according to the same RS resource locations assumed by the base station, so as to correctly receive and decode the data channel. However, for the U-DRS, compared with the existing DRS, there may be a PSS and an SSS that are replicated, for example, in the frequency domain or in the time domain, at resource locations of the PSS and the SSS that are included in the U-DRS. Compared with those in the existing DRS, the CRSs included in the U-DRS may be filled on more OFDM symbols. These lead to different resource locations of the U-DRS from those of the existing DRS in a subframe, and result in different RSs for rate matching when a data channel and/or a control channel are/is sent in the DMTC. How to specifically make a base station and a UE have a same understanding of an RS for rate matching is a problem to be resolved urgently.

Figure 3:
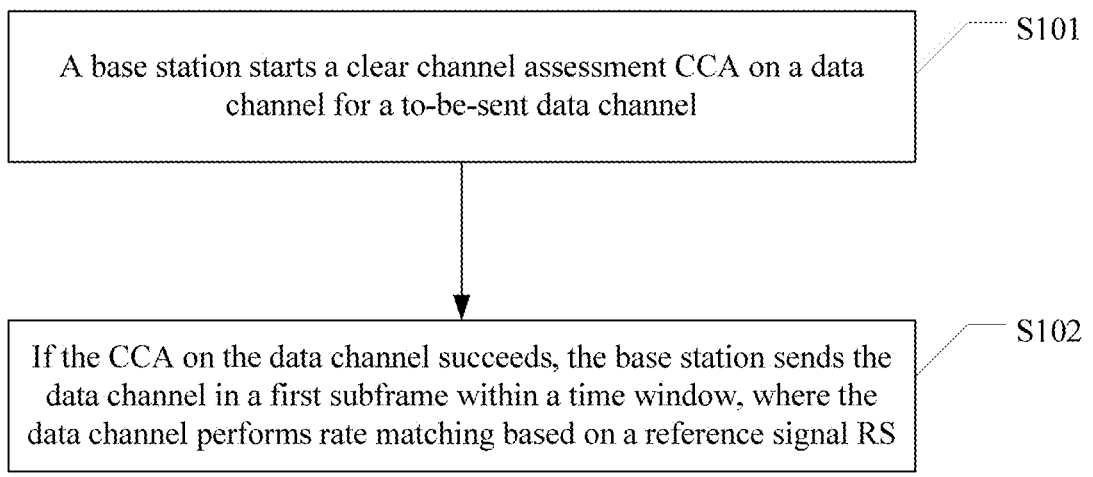
FIG. 3 is a schematic diagram of a data channel sending method according to an embodiment of the present disclosure.

For rate matching performed by a data channel and/or a control channel in the DMTC based on an RS, FIG. 3 shows a data channel sending method according to the present disclosure. The method is used on a base station side, and includes the following steps.

Step 101: A base station starts a clear channel assessment CCA on a data channel for a to-be-sent data channel.

Specifically, once data exists in a cache on the base station side, the base station may start the CCA for the to-be-sent data channel. The CCA needs to be based on an LBT rule of a backoff mechanism. The backoff mechanism is described above. Alternatively, the base station may perform a CCA when there is no data in the cache, for example, when the base station predicts that data will soon arrive in the cache. In this case, performing a CCA in advance may increase an opportunity for successfully sending the data that is to arrive, and shorten a sending delay.

It should be noted that the data channel may be a PDSCH. In addition, a data channel is generally scheduled by a control channel. That is, the control channel and the data channel scheduled by the control channel are generally sent in one subframe. Certainly, the control channel and the data channel scheduled by the control channel may be sent in different subframes. This is equivalent to performing a CCA on the control channel. That is, the CCA may be performed for the control channel and/or the data channel.

Step 102: If the CCA on the data channel succeeds, the base station sends the data channel in a first subframe within a time window, where the data channel performs rate matching based on a reference signal RS.

The RS includes a first RS or a second RS. The first RS occupies continuous OFDM symbols in a subframe, and the second RS occupies discontinuous OFDM symbols in a subframe. The time window is a preset time window used to send the first RS, and the first RS is used by a user equipment (UE) to perform cell identification and/or a radio resource management (RRM) measurement on a cell served by the base station.

If the CCA on the data channel succeeds, that is, a backoff counter counts down to 0, exactly at a candidate start sending time point of the data channel and/or the control channel of the data channel, the data channel and/or the control channel of the data channel may be directly sent. If the CCA on the data channel succeeds not at the candidate start sending time point of the data channel and/or the control channel of the data channel, some channel occupation signals may be first sent for a period of time, and when the candidate start sending time point is reached, the data channel and/or the control channel of the data channel start/starts to be sent. The channel occupation signals may be any random signals or existing signals.

The data channel generally indicates the PDSCH. The control channel may be a physical downlink control channel (PDCCH) or an enhanced physical downlink control channel (EPDCCH). The PDCCH and the PDSCH are separated by time in one subframe. Specifically, the PDCCH occupies the first n OFDM symbols of the subframe, and the PDSCH is sent from an $(n+1)^{th}$ symbol to an end of the subframe. A value of n is indicated by a physical control format indicator channel (PCFICH) sent on a first OFDM symbol in each subframe. For example, a value range of n is generally {1, 2, 3, 4}. The EPDCCH generally starts from an $(n+1)^{th}$ symbol of a subframe. Specifically, a start symbol of the EPDCCH may be indicated by a PCFICH or preconfigured by using higher layer signaling. The EPDCCH and the PDSCH are separated by frequency, that is, the EPDCCH and the PDSCH occupy different resource blocks (RB) in a frequency domain. A position of a start symbol of the PDSCH scheduled by the EPDCCH is generally the same as that of the EPDCCH, or preconfigured by using higher layer signaling.

The time window is a time window of a DMTC. A length of the time window is generally 6 ms, that is, duration of six subframes. A period of the time window may be configured as 40 ms, 80 ms, or 160 ms. In addition, the DMTC is configured based on a frequency. That is, for a frequency, the UE assumes that there is a maximum of one DMTC. Therefore, in normal implementation, DMTCs of multiple cells deployed on the frequency need to overlap or even completely overlap. The time window is used for a cell to send a U-DRS, and correspondingly, for the UE to detect the U-DRS within the time window. For example, the base station may choose one subframe from six subframes in a DMTC according to a CCA result of a U-DRS to send the U-DRS. The UE needs to detect, in the DMTC, a PSS and a SSS in the U-DRS, to first synchronize with a cell corresponding to the PSS and the SSS, obtain a cell identifier of the cell, and then perform an RRM measurement on the cell according to CRSs and/or filled-in CRSs in the U-DRS. Certainly, the UE may perform cell synchronization and identification by detecting the CRSs, or perform cell synchronization and identification according to the PSS, the SSS, and the CRSs herein.

According to the foregoing description, for a cell on an unlicensed spectrum, resource locations of the U-DRS are different from those of an existing DRS in a subframe. Therefore, an RS used for performing rate matching when the data channel and/or the control channel of the data channel are/is sent needs to be determined. The RS may be a first RS or a second RS. Specifically, the first RS is the U-DRS. The U-DRS may include the original CRSs in a time domain, that is, CRSs occupying discontinuous symbols 0, 4, 7, and 11, and may further include the CRSs replicated and filled on other symbols in the time domain, such as CRSs on symbols 1, 2, 3, and 8; and may further include the original PSS and SSS in the frequency domain, and may further include multiple PSSs and SSSs replicated in the frequency domain. The second RS may include the original CRSs, that is, the CRSs occupying the discontinuous symbols 0, 4, 7, and 11, and may further include the original PSS and SSS, that is, a PSS and a SSS in a carrier frequency domain center. It can be learned that the CRSs in the first RS include the CRSs in the second RS, and/or the PSSs and the SSSS in the first RS include the PSS and the SSS in the second RS.

According to the foregoing method, different RSs are determined for performing rate matching when the data channel and the control channel that schedules the data channel are sent, improving RRM measurement performance in a subframe of the U-DRS, and reducing reference signal overheads in a subframe of the second RS.

Optionally, if an index number of the first subframe is 0 and/or 5, the RS is the first RS; or if the index number of the first subframe is not 0 or 5, the RS is the second RS.

Figure 4:
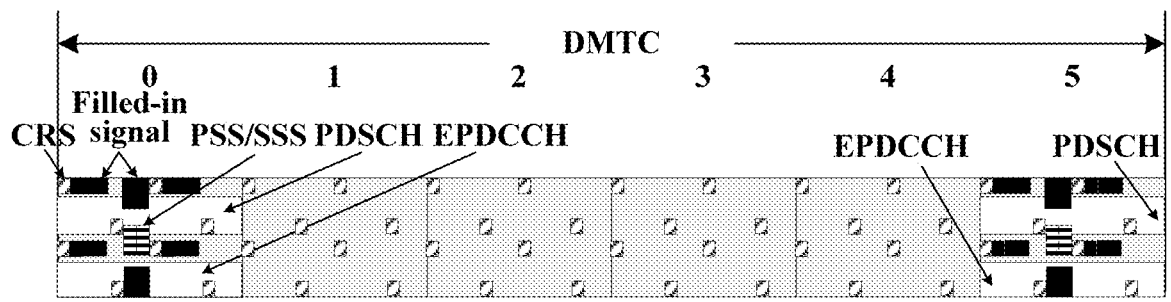
FIG. 4 is a schematic diagram of a first implementation of a data channel sending method according to an embodiment of the present disclosure.

An embodiment described with reference to FIG. 4 further provides an implementation. Herein, it is assumed that the data channel and/or the control channel may be sent together with the U-DRS in a subframe 0 and/or a subframe 5 in the DMTC, but cannot be sent together with the U-DRS in a subframe in the DMTC different from the subframe 0 and the subframe 5, for example, subframes 1 to 4. It should be noted that, if the U-DRS is sent but the data channel and/or the control channel are/is not sent, the U-DRS may be sent in the subframe in the DMTC different from the subframes 0 and 5, specifically according to a CCA result of the U-DRS. Specifically, if a CCA on the data channel and/or the control channel fails, but a CCA on the U-DRS succeeds, the base station sends the U-DRS in a maximum of one subframe in the DMTC, but does not send the data channel and/or the control channel in this case. However, if the data channel and/or the control channel are/is sent together with the U-DRS in one subframe, generally speaking, the CCA on the data channel and/or the control channel have/has certainly succeeded, because a priority of the CCA on the data channel and/or the control channel is lower than that of the CCA on the U-DRS. Generally, in this case, the data channel and/or the control channel are/is sent for a period of time, that is, multiple subframes. The multiple subframes may be referred to as a burst of the data channel, generally including the subframe 0 and/or the subframe 5. Therefore, the U-DRS may be sent in the several sending subframes along with the data channel and/or the control channel, and sent in the subframe 0 or the subframe 5 in the multiple subframes. Hence, in some sense, the U-DRS does not need to be sent in the subframes 1 to 4. However, if the DMTC includes both the subframe 0 and the subframe 5, normally, the U-DRS needs to be sent in only one subframe in the DMTC.

For example, the U-DRS is not sent together with the data channel and/or the control channel. However, as shown in FIG. 4, to simplify system design and lower UE implementation complexity, if the burst of data channel includes the subframe 0 and the subframe 5 in the DMTC, both the base station and the UE assume that the data channel and the control channel on both the subframe 0 and the subframe 5 perform rate matching based on the U-DRS. In this case, there is no need to notify the UE that rate matching based on the U-DRS is performed in which subframe of the subframe 0 and the subframe 5. In addition, for the subframe 1 to subframe 4 included in the burst of data channel, both the base station and the UE assume that the data channel and the control channel perform rate matching based on the second RS. For the subframe 1 to subframe 4, the second RS is the existing CRSs occupying discontinuous OFDM symbols.

Optionally, the base station sends a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

Figure 5:
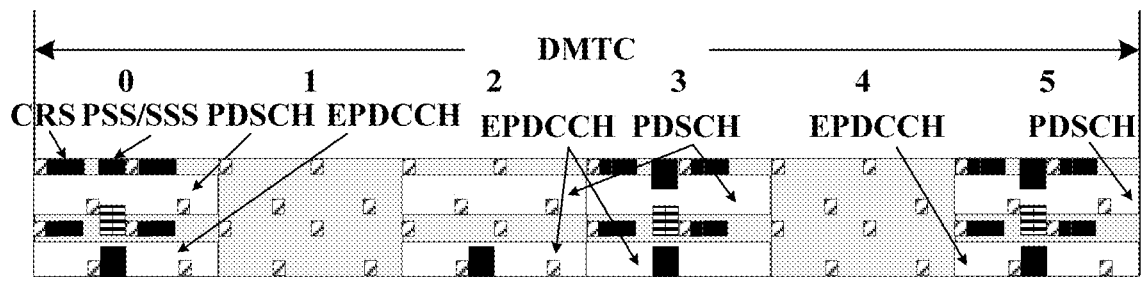
FIG. 5 is a schematic diagram of a second implementation of a data channel sending method according to an embodiment of the present disclosure.

An embodiment described with reference to FIG. 5 further provides another implementation. For descriptions of the control channel and the data channel scheduled by the control channel, refer to the foregoing description. Details are not repeated herein. This implementation is different from the implementation provided by FIG. 4. Herein, it is assumed that information about rate matching performed based on the RS by the data channel needs to be indicated to the UE. In a specific indication manner, the information about rate matching may be preset instead of being indicated by using signaling, or may be pre-informed by using higher layer signaling, or may be indicated by using dynamic signaling. Preferably, the dynamic signaling is the control channel that schedules the data channel. In one manner, the information about rate matching performed based on the RS by the data channel on a subframe 0 and a subframe 5 in the DMTC is preset, or pre-informed by using the higher layer signaling. For example, the data channel in the subframe 0 performs rate matching based on the U-DRS, and the data channel in the subframe 5 performs rate matching based on the second RS. The second RS includes the existing PSS, SSS, and CRSs. In this example, the data channel and the U-DRS are still not allowed to be sent together in a subframe 1 to a subframe 4. In another manner, the information about rate matching is indicated by the dynamic signaling. Preferably, the dynamic signaling is the control channel that schedules the data channel. Specifically, rate matching performed by the control channel needs to be rate matching performed based on the U-DRS, or may be rate matching performed based on a preconfigured RS. For example, an EPDCCH in the subframe 0 and the subframe 5 in FIG. 5 performs rate matching based on the U-DRS. Information about rate matching performed by a PDSCH scheduled by the EPDCCH is indicated by the EPDCCH, and specifically, rate matching is performed based on the U-DRS or the second RS. Specifically, the information about rate matching may be indicated by using bits or scrambling code in the EPDCCH. The bits include new bits or existing bits reused, for example, all or some bits of two bits indicating rate matching in an existing EPDCCH with a downlink control information (DCI) format 2D. As shown in FIG. 5, the EPDCCH in subframes 0, 2, 3, and 5 performs rate matching based on the U-DRS. The PDSCH in the subframe 0 is dynamically instructed to perform rate matching based on the second RS (which is the existing PSS, SSS, and CRSs in this case), the PDSCH in the subframe 2 is dynamically instructed to perform rate matching based on the second RS (which is the existing CRSs in this case), the PDSCH in the subframe 3 is dynamically instructed to perform rate matching based on the U-DRS, and the PDSCH in the subframe 5 is dynamically instructed to perform rate matching based on the U-DRS. It should be noted that, the assumption of performing rate matching based on the U-DRS does not mean that the base station definitely sends the U-DRS. Whether to send the U-DRS belongs to a scope of base station implementation. The base station may choose to send one U-DRS in one DMTC, or may send multiple U-DRSs in one DMTC in a burst of the data channel. No limitation is imposed. It can be learned that, in the implementation provided by FIG. 5, the data channel and the U-DRS may be multiplexed in the subframe 0 and the subframe 5, but not multiplexed in another subframe different from the subframe 0 and the subframe 5. Alternatively, the data channel and the U-DRS may be multiplexed in the subframe 0 and the subframe 5, and may also be multiplexed in another subframe different from the subframe 0 and the subframe 5. No limitation is imposed herein, either. According to the implementation provided by FIG. 5, a manner of rate matching performed based on the RS by the data channel may be dynamically indicated. The solution is more flexible. Compared with the implementation provided by FIG. 4 (in the implementation provided by FIG. 4, it is assumed that the data channel and the U-DRS cannot be multiplexed in a subframe different from the subframe 0 and the subframe 5), this implementation does not have any limitation on sending of the U-DRS. In addition, system overheads can be flexibly adjusted, but at a cost of introducing indication signaling in some indication manners.

Figure 6:
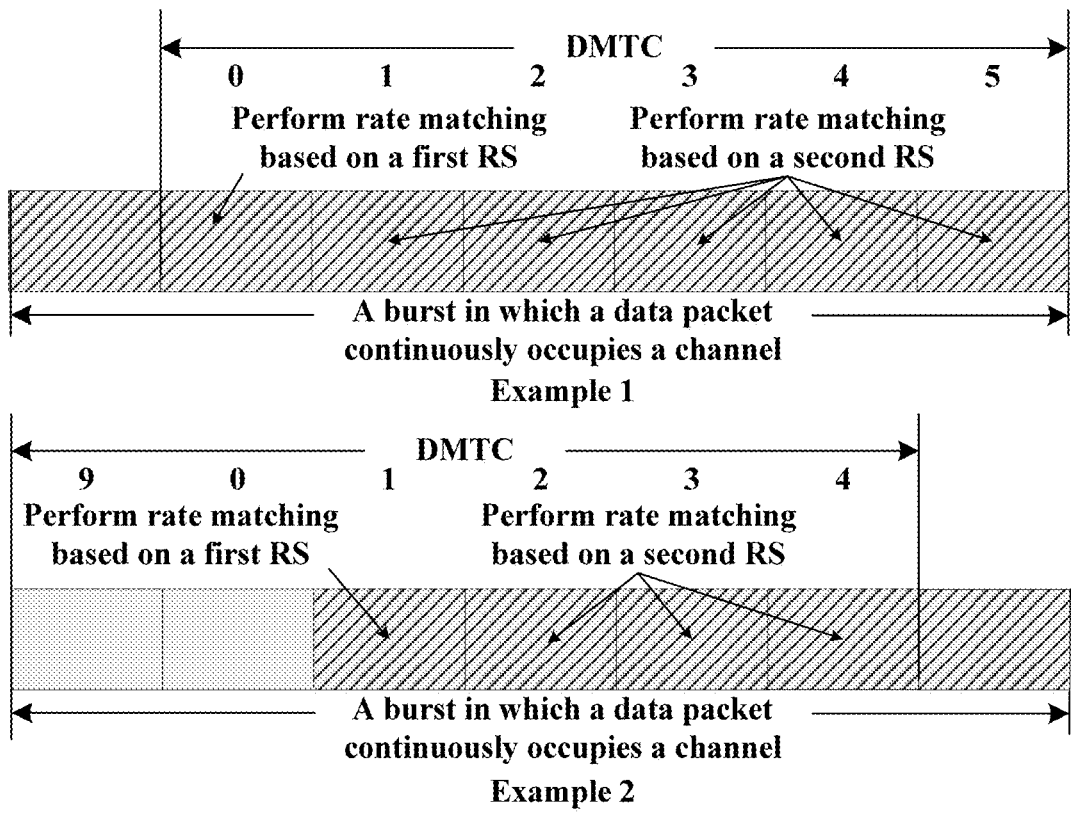
FIG. 6 is a schematic diagram of a further method 1 of a data channel sending method according to an embodiment of the present disclosure.

An embodiment described with reference to FIG. 6 further provides another implementation. Specifically, if a burst of the data channel includes a subframe 0 but does not include a subframe 5 in the DMTC, the data channel and/or the control channel in the subframe 0 perform/performs rate matching based on the U-DRS, and the data channel and/or the control channel in another subframe of the burst perform/performs rate matching based on the second RS. Alternatively, if a burst of the data channel includes a subframe 5 but does not include a subframe 0 in the DMTC, the data channel and/or the control channel in the subframe 5 perform/performs rate matching based on the U-DRS, and the data channel and/or the control channel in another subframe of the burst perform/performs rate matching based on the second RS. Alternatively, if a burst of the data channel includes a subframe 0 and a subframe 5 in the DMTC, the data channel and/or the control channel in an always-first subframe of the subframe 0 and the subframe 5 perform/performs rate matching based on the U-DRS, and the data channel and/or the control channel in another subframe of the burst perform/performs rate matching based on the second RS. Alternatively, if a burst of the data channel does not include a subframe 0 or a subframe 5 in the DMTC, the data channel and/or the control channel in an always-first subframe of overlapping subframes between the burst and the DMTC perform/performs rate matching based on the U-DRS, and the data channel and/or the control channel in another subframe of the burst perform/performs rate matching based on the second RS. Details are shown in FIG. 6. Specifically, the UE may determine subframes occupied by the burst of the data channel in multiple manners. In one determining manner, the UE detects indication information sent by the base station, and determines a start subframe and an end subframe of the burst according to the indication information. For example, the indication information indicates the start subframe and a quantity of subframes occupied by the burst, or directly indicates the start subframe and the end subframe of the burst. In another determining manner, the UE may perform a blind detection. For example, the UE performs a blind detection on a sequence of an initial signal before the burst. If the sequence is detected, the start subframe of the burst is found. Then, the UE further detects a control channel in the start subframe of the burst. The control channel indicates the end subframe of the burst or the quantity of subframes occupied by the burst. In the implementation provided by FIG. 6, there is also no limitation on scheduling, and rate matching based on the U-DRS does not need to be performed in each subframe. This reduces overheads, but requires the UE to learn information about the burst of the data channel.

Optionally, a sending time point, determined according to the successful CCA on the data channel, of the data channel and/or the control channel that schedules the data channel is a first time point.

If the first time point is not later than a start sending time point of the first RS in the first subframe, the RS is the first RS.

Alternatively, if the first time point is not earlier than a start sending time point of a synchronization signal in the first RS in the first subframe, the RS is the second RS or a part of the second RS.

It can be learned from the foregoing descriptions of the data channel and the control channel that, one subframe in an existing LTE system has only one candidate start sending time point. Specifically, for the PDCCH and the PDSCH scheduled by the PDCCH, generally, a start sending point of the PDCCH is the first OFDM symbol in each subframe, and a start point of the PDSCH is indicated by the PCFICH, that is, there may be multiple start points for the PDSCH, and the multiple start points are all indicated by the PCFICH sent on the first OFDM symbol. For the EPDCCH and the PDSCH scheduled by the EPDCCH, a start point is indicated by the PCFICH or configured by using the high layer signaling. If the start point is indicated by the PCFICH, it means that there may also be multiple start points for the EPDCCH and the PDSCH. However, in this case, the PCFICH needs to be sent on the first OFDM symbol of the subframe.

For a cell on an unlicensed spectrum, one subframe may have multiple candidate start sending time points. The multiple candidate start sending time points are different from the multiple start points that are of the PDSCH or the EPDCCH and that are indicated by the PCFICH, and the multiple candidate start sending time points in the subframe on the unlicensed spectrum are not indicated by a PCFICH on a first OFDM symbol of the subframe. For example, for a PDCCH and a PDSCH scheduled by the PDCCH, if a CCA succeeds before a first candidate start sending time point, a PCFICH, the PDCCH, and the PDSCH may start to be sent at the first candidate start sending time point; or if the CCA succeeds between the first candidate start sending time point and a second candidate start sending time point, the PCFICH, the PDCCH and the PDSCH may start to be sent at the second candidate start sending time point. Certainly, the PCFICH may not be sent at this time, and only a quantity of symbols occupied by the PDCCH is preset. In this case, a quantity of symbols excluding the symbols occupied by the PDCCH starting from a start sending time point is a quantity of symbols occupied by the PDSCH. For an EPDCCH and a PDSCH scheduled by the EPDCCH, a case is similar to that of the PDCCH. A start sending time point is also related to a time point at which the CCA succeeds. For example, it is assumed that there are two candidate start sending time points in one subframe. In one manner, a symbol 0 is used as a first start point, and a symbol 3 is used as a second start point. Alternatively, in another manner, a symbol 0 is used as a first start point, and a symbol 7 is used as a second start point. Alternatively, there are more candidate start points, such as a symbol 0, a symbol 3, and a symbol 7. Alternatively, two groups of two candidate start points may be switched between each other, for example, one group is a symbol 0 and a symbol 3, and the other group is a symbol 0 and a symbol 7. Similar manners and symbol index numbers are not limited.

Figure 7:
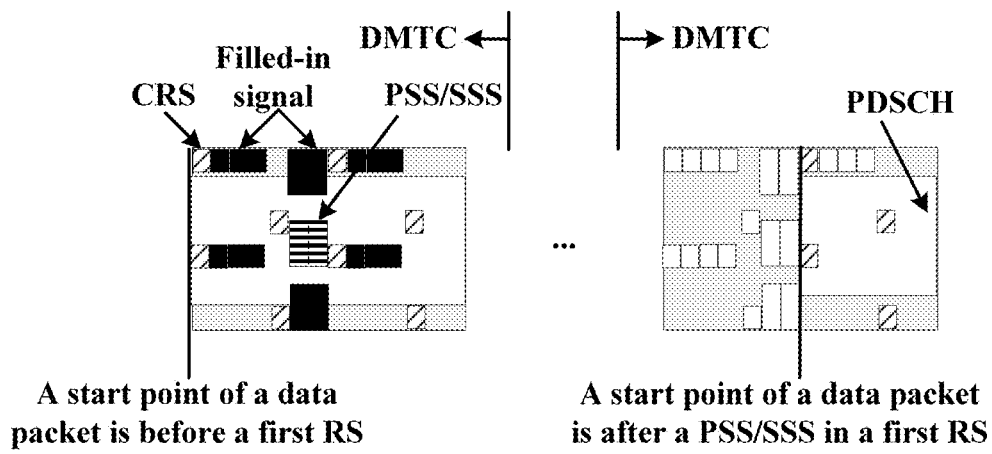
FIG. 7 is a schematic diagram of a further method 2 of a data channel sending method according to an embodiment of the present disclosure.

FIG. 7 further provides an implementation. Impact of the multiple candidate start sending time points on rate matching is described. The sending time point, determined according to the successful CCA on the data channel, of the data channel and/or the control channel that schedules the data channel is the first time point. If the first time point is not later than the start sending time point of the first RS in the first subframe, the RS is the first RS. Alternatively, if the first time point is not earlier than the start sending time point of the synchronization signal in the first RS in the first subframe, the RS is the second RS or a part of the second RS.

When the first time point, determined according to the successful CCA on the data channel and/or the control channel, of the data channel and/or the control channel is a first candidate start sending time point, for example, a symbol 0, if a start sending time point of the U-DRS is also the symbol 0, that is, the first time point is not later than the start sending time point of the U-DRS in the first subframe, as shown in a first subframe in a first DMTC of FIG. 7, the data channel and/or the control channel in the first subframe perform/performs rate matching based on the U-DRS, or the control channel performs rate matching based on the U-DRS, and information about rate matching performed by the data channel is indicated by the control channel.

When the first time point, determined according to the successful CCA on the data channel and/or the control channel, of the data channel and/or the control channel is a second candidate start sending time point, for example, a symbol 7, if the start sending time point of the U-DRS is still the symbol 0, that is, the first time point is not earlier than the start sending time point of the U-DRS in the first subframe, as shown in a first subframe in a second DMTC of FIG. 7, the data channel and/or the control channel in the first subframe perform/performs rate matching based on the second RS, where the second RS may be specifically the existing CRSs. The PSS and the SSS in the U-DRS cannot be sent in the first subframe, that is, the UE cannot detect the PSS and the SSS in the U-DRS in the subframe. Therefore, there is no need to assume that rate matching is performed in the first subframe based on the U-DRS, and only rate matching based on the second RS needs to be performed. This reduces RS overheads, and improves performance of the data channel and/or the control channel.

When the first time point, determined according to the successful CCA on the data channel and/or the control channel, of the data channel and/or the control channel is a second candidate start sending time point, for example, a symbol 3, if the start sending time point of the U-DRS is still the symbol 0, that is, the first time point is not earlier than the start sending time point of the U-DRS in the first subframe, and not later than sending time points of the PSS and the SSS in the U-DRS, and in this case, the symbol 3 is still used as a start point to send the data channel and/or the control channel, and the symbol 3 is still used as a start point to send a part of the U-DRS in the subframe, that is, a part of the U-DRS between the symbol 0 and the symbol 3 is not sent, a problem is: When the UE can detect the PSS and SSS sent in the subframe, the UE assumes that the U-DRS in the subframe is successfully sent, and hence uses the signals, between the symbol 0 and the symbol 3, at resource locations of the U-DRS that have actually not been sent to perform an RRM measurement, leading to an incorrect RRM measurement result. To resolve the problem, one solution is: It is not allowed to use the symbol 3 as the start point to send the data channel and/or the control channel in the first subframe. Another solution is: The symbol 3 may be used as the start point to send the data channel and/or the control channel in the first subframe, but at least the PSS and the SSS in the subframe are not sent. Certainly, other filled-in CRSs in the U-DRS may not be sent either. For rate matching performed by the data channel and/or the control channel, it may be assumed that rate matching is performed based on the U-DRS, or rate matching may be performed directly based on the second RS.

Figure 8:
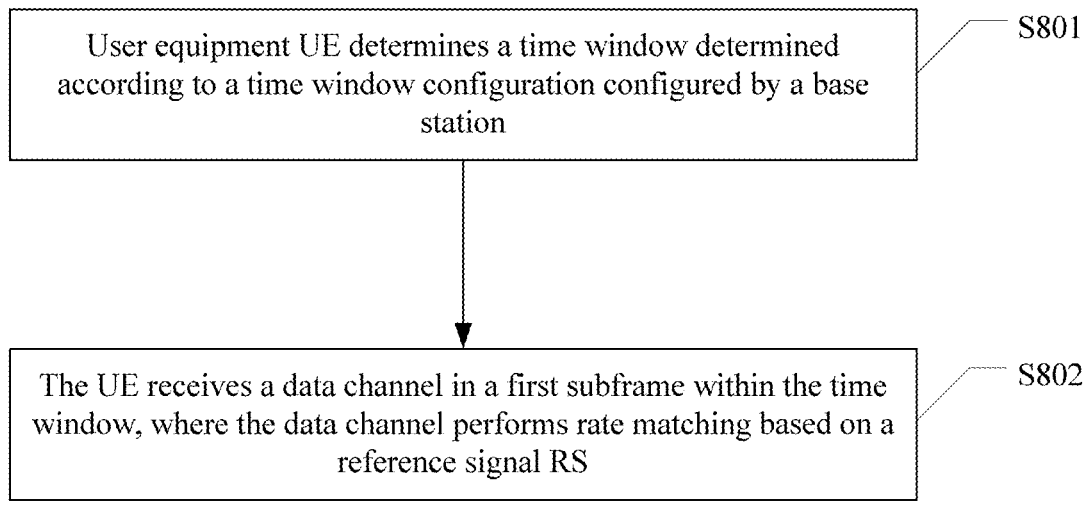
FIG. 8 is a schematic diagram of a data channel receiving method according to an embodiment of the present disclosure.

FIG. 8 shows a data channel receiving method according to the present disclosure. The method is used on a UE side, and includes the following steps.

Step 801: A user equipment (UE) determines a time window according to a time window configured by a base station.

Step 802: The UE receives a data channel in a first subframe within the time window, where the data channel performs rate matching based on a reference signal RS.

The RS includes a first RS or a second RS. The first RS occupies continuous OFDM symbols in a subframe, and the second RS occupies discontinuous OFDM symbols in a subframe. The time window is a preset time window used to send the first RS, and the first RS is used by the UE to perform cell identification and/or a radio resource management (RRM) measurement on a cell served by the base station.

According to the foregoing method, different RSs are determined for performing rate matching when the data channel and a control channel that schedules the data channel are sent, improving RRM measurement performance in a subframe of a U-DRS, and reducing reference signal overheads in a subframe of the second RS.

Optionally, the UE receives a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

Optionally, if an index number of the first subframe is 0 and/or 5, the RS is the first RS; or if the index number of the first subframe is not 0 or 5, the RS is the second RS.

Optionally, the UE determines a first time point, in the first subframe, of the data channel and/or the control channel that schedules the data channel.

If the first time point is not later than a start sending time point of the first RS in the first subframe, the RS is the first RS.

Alternatively, if the first time point is not earlier than a start sending time point of a synchronization signal in the first RS in the first subframe, the RS is the second RS or a part of the second RS.

A specific embodiment description is corresponding to that of the method on a base station side. Reference may be made to descriptions of the foregoing embodiments on the base station side. Details are not repeated herein.

Figure 9:
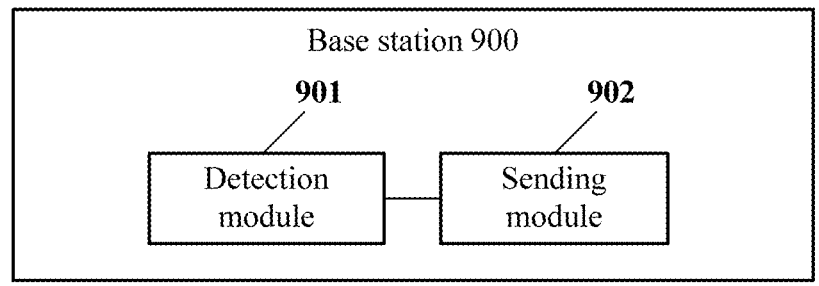
FIG. 9 is a schematic structural diagram of a base station according to an embodiment of the present disclosure.

FIG. 9 shows a base station according to the present disclosure, including:

a detection module 901, configured to start a clear channel assessment CCA on a data channel for a to-be-sent data channel; and a sending module 902, configured to send the data channel in a first subframe within a time window according to a result that is of the successful CCA on the data channel and that is obtained by the detection module, where the data channel performs rate matching based on a reference signal RS.

The RS includes a first RS or a second RS. The first RS occupies continuous OFDM symbols in a subframe, and the second RS occupies discontinuous OFDM symbols in a subframe. The time window is a preset time window used to send the first RS, and the first RS is used by a user equipment (UE) to perform cell identification and/or a radio resource management (RRM) measurement on a cell served by the base station.

According to the foregoing user equipment, different RSs are determined for performing rate matching when the data channel and a control channel that schedules the data channel are sent, improving RRM measurement performance in a subframe of a U-DRS, and reducing reference signal overheads in a subframe of the second RS.

Optionally, the sending module of the base station is further configured to send a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

Optionally, if an index number of the first subframe is 0 and/or 5, the RS is the first RS; or if the index number of the first subframe is not 0 or 5, the RS is the second RS.

Optionally, if the detection module obtains a result that the CCA on the data channel fails but a CCA on the first RS succeeds, the sending module is configured to send the first RS in a maximum of one subframe within the time window, but does not send the data channel.

Optionally, a sending time point, determined according to the successful CCA that is on the data channel and that is determined by the detection module, of the data channel and/or the control channel that schedules the data channel is a first time point.

If the first time point is not later than a start sending time point of the first RS in the first subframe, the RS is the first RS.

Alternatively, if the first time point is not earlier than a start sending time point of a synchronization signal in the first RS in the first subframe, the RS is the second RS or a part of the second RS.

A specific embodiment description is similar to that of the method on a base station side. Reference may be made to descriptions of the foregoing embodiments. Details are not repeated herein.

Figure 10:
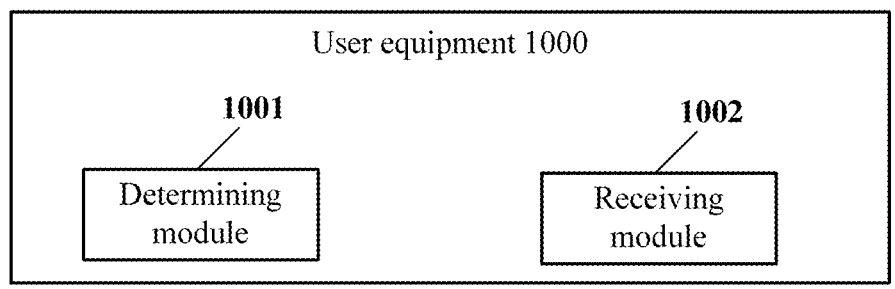
FIG. 10 is a schematic structural diagram of user equipment according to an embodiment of the present disclosure.

FIG. 10 shows UE according to the present disclosure, including:

a determining module 1001, configured to determine a time window according to a time window configured by a base station; and a receiving module 1002, configured to receive a data channel in a first subframe within the time window determined by the determining module, where the data channel performs rate matching based on a reference signal RS.

The RS includes a first RS or a second RS. The first RS occupies continuous OFDM symbols in a subframe, and the second RS occupies discontinuous OFDM symbols in a subframe. The time window is a preset time window used to send the first RS, and the first RS is used by the UE to perform cell identification and/or a radio resource management (RRM) measurement on a cell served by the base station.

According to the foregoing access network equipment, different RSs are determined for performing rate matching when the data channel and a control channel that schedules the data channel are sent, improving RRM measurement performance in a subframe of a U-DRS, and reducing reference signal overheads in a subframe of the second RS.

Optionally, the receiving module of the UE is further configured to receive a control channel in the first subframe, where the control channel is used to carry scheduling information of the data channel, the control channel performs rate matching based on the first RS, the scheduling information includes rate matching indication information, and the rate matching indication information is used to instruct the data channel to perform rate matching based on the first RS or the second RS.

Optionally, if an index number of the first subframe is 0 and/or 5, the RS is the first RS; or if the index number of the first subframe is not 0 or 5, the RS is the second RS.

Optionally, the receiving module is further configured to determine a first time point, in the first subframe, of the data channel and/or the control channel that schedules the data channel.

If the first time point is not later than a start sending time point of the first RS in the first subframe, the RS is the first RS.

Alternatively, if the first time point is not earlier than a start sending time point of a synchronization signal in the first RS in the first subframe, the RS is the second RS or a part of the second RS.

A specific embodiment description is similar to that of the method on a UE side. Reference may be made to descriptions of the foregoing embodiments. Details are not repeated herein.

It should be understood that, the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), and a Worldwide Interoperability for Microwave Access (WiMAX) communications system.

It should be further understood that in the embodiments of the present disclosure, a user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a "cellular" phone), a computer with a mobile terminal, or the like. For example, the user equipment may also be a portable, pocket-sized, handheld, computer built-in, or in-vehicle mobile apparatus, which exchanges voice and/or data with the radio access network.

In the embodiments of the present disclosure, a base station may be a base transceiver station (BTS) in a GSM or CDMA, may be a NodeB (NB) in WCDMA, or may be an evolved NodeB (ENB or e-NodeB) in LTE. This is not limited in the present disclosure.

In the several embodiments provided in this application, it should be understood that the disclosed apparatus, method, and system may be implemented in other manners. For example, the described apparatus embodiment is merely an example. For example, the unit division is merely logical function division and may be other division in actual implementation. For example, multiple units or modules may be combined or integrated into another system, or some features may be ignored or not performed.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data channel receiving method, comprising:
   determining, by a user equipment (UE), a time window according to a time window configured by a base station;
   receiving, by the UE, a data channel in a first subframe within the time window, wherein the data channel performs rate matching based on a reference signal (RS), wherein the RS comprises a first RS or a second RS, the first RS occupies continuous orthogonal frequency-division multiplexing (OFDM) symbols in a subframe, and the second RS occupies discontinuous OFDM symbols in a subframe, and wherein the time window is a preset time window used to send the first RS, and the first RS is used by the UE to perform cell identification and/or a radio resource management (RRM) measurement on a cell served by the base station; and
   receiving, by the UE, a control channel in the first subframe, wherein the control channel carries scheduling information of the data channel, the control channel performs rate matching based on the first RS, the scheduling information comprises rate matching indication information, and the rate matching indication information is used to instruct the data channel to perform rate matching based on the first RS or the second RS.

2. The method according to claim 1, wherein
   if an index number of the first subframe is 0 or 5, the RS is the first RS; and
   if the index number of the first subframe is not 0 or 5, the RS is the second RS.

3. The method according to claim 1, further comprising:
   determining, by the UE, a first time point in the first subframe of the data channel and/or the control channel that schedules the data channel; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

4. A base station, comprising:

a computer readable storage medium storing instructions; and computer hardware configured to execute the instructions to cause the base station to:

start a clear channel assessment (CCA) on a data channel for a to-be-sent data channel;

send the data channel in a first subframe within a time window according to a result that is of the successful CCA on the data channel, wherein the data channel performs rate matching based on a reference signal (RS), wherein the RS comprises a first RS or a second RS, the first RS occupies continuous orthogonal frequency-division multiplexing (OFDM) symbols in a subframe, and the second RS occupies discontinuous OFDM symbols in a subframe, and wherein the time window is a preset time window used to send the first RS, and the first RS is used by a user equipment (UE) to perform cell identification and/or a radio resource management (RRM) measurement on a cell served by the base station; and send a control channel in the first subframe, wherein the control channel carries scheduling information of the data channel, the control channel performs rate matching based on the first RS, the scheduling information comprises rate matching indication information, and the rate matching indication information is used to instruct the data channel to perform rate matching based on the first RS or the second RS.

5. The base station according to claim 4, wherein if an index number of the first subframe is 0 or 5, the RS is the first RS; and if the index number of the first subframe is not 0 or 5, the RS is the second RS.

6. The base station according to claim 4, wherein if a result that the CCA on the data channel fails but a CCA on the first RS succeeds, the base station is configured to send the first RS in a maximum of one subframe within the time window, but does not send the data channel.

7. The base station according to claim 4, wherein a sending time point, determined according to the successful CCA that is on the data channel of the data channel and/or the control channel that schedules the data channel is a first time point; and if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

8. A user equipment (UE), comprising:

a computer readable storage medium storing instructions; and computer hardware configured to execute the instructions to cause the UE to:

receive a time window from a base station;

receive a data channel in a first subframe within the time window, wherein the data channel performs rate matching based on a reference signal (RS), wherein the RS comprises a first RS or a second RS, the first RS occupies continuous orthogonal frequency-division multiplexing (OFDM) symbols in a subframe, and the second RS occupies discontinuous OFDM symbols in a subframe, and wherein the time window is a preset time window used to send the first RS, and the first RS is used by the UE to perform cell identification and/or a radio resource management (RRM) measurement on a cell served by the base station; and determine a first time point, in the first subframe, of the data channel and/or the control channel that schedules the data channel;

wherein:

if the first time point is not later than a start sending time point of the first RS in the first subframe, the RS is the first RS; or if the first time point is not earlier than a start sending time point of a synchronization signal in the first RS in the first subframe, the RS is the second RS or a part of the second RS.

9. The UE according to claim 8, wherein the computer hardware executing the instructions further causes the UE to:

receive a control channel in the first subframe, wherein the control channel carries scheduling information of the data channel, the control channel performs rate matching based on the first RS, the scheduling information comprises rate matching indication information, and the rate matching indication information is used to instruct the data channel to perform rate matching based on the first RS or the second RS.

10. The UE according to claim 8, wherein if an index number of the first subframe is 0 or 5, the RS is the first RS; and if the index number of the first subframe is not 0 or 5, the RS is the second RS.

* * * * *